US008474153B2

(12) United States Patent
Brie et al.

(10) Patent No.: US 8,474,153 B2
(45) Date of Patent: Jul. 2, 2013

(54) ADAPTABLE SHOE COVER

(75) Inventors: Serge Brie, Quebec (CA); Denis Rancourt, Rock Forest (CA); Marc Denninger, Sherbrooke (CA)

(73) Assignee: Alfred Cloutier Ltée, Quebec (CA)

( * ) Notice: Subject to any disclaimer, the term of this patent is extended or adjusted under 35 U.S.C. 154(b) by 738 days.

(21) Appl. No.: 12/066,824

(22) PCT Filed: Jun. 30, 2006

(86) PCT No.: PCT/CA2006/001086
§ 371 (c)(1),
(2), (4) Date: Mar. 13, 2008

(87) PCT Pub. No.: WO2007/030910
PCT Pub. Date: Mar. 22, 2007

(65) Prior Publication Data
US 2008/0184592 A1 Aug. 7, 2008

(30) Foreign Application Priority Data
Sep. 15, 2005 (CA) .................................. 2519850

(51) Int. Cl.
*A43B 3/16* (2006.01)
(52) U.S. Cl.
USPC .............................. 36/7.1 R; 36/25 R; 36/103
(58) Field of Classification Search
USPC .................. 36/25 R, 103, 28, 30 R, 102, 31, 36/7.1 R, 7.3, 7.4, 4
See application file for complete search history.

(56) References Cited

U.S. PATENT DOCUMENTS

| 189,408 A | * | 4/1877 | Watson et al. ................... 36/7.2 |
| 736,082 A | | 8/1903 | Foreman et al. |
| 927,282 A | * | 7/1909 | Reed ................................ 36/7.4 |
| 1,245,847 A | * | 11/1917 | Wilt .................................. 36/7.2 |
| 2,068,238 A | | 1/1937 | Malm |
| 2,776,499 A | | 1/1957 | Giuntini |
| 2,787,063 A | | 4/1957 | Austin |
| 2,860,425 A | | 11/1958 | Jackson |
| 2,970,390 A | | 2/1961 | Brough et al. |

(Continued)

FOREIGN PATENT DOCUMENTS
CA 114360 5/2007

OTHER PUBLICATIONS
International Preliminary Report on Patentability dated Mar. 18, 2008 in PCT/CA2006/001086, filed Jun. 30, 2006.

*Primary Examiner* — Jila M Mohandesi
(74) *Attorney, Agent, or Firm* — Knobbe Martens Olson & Bear LLP

(57) ABSTRACT

The present invention provides a shoe cover to adaptively fit over a shoe. The show cover has a sole, which includes at least two rigid bands of rigid material, disposed on the bottom of the sole and arranged in spaced relation to each other on opposite sides of a longitudinal axis of the sole, thereby rigidifying the sole. The sole also has an elastic band of the flexible material, spanning longitudinally between the two rigid bands from the front to the rear of the sole, thereby enabling lateral flexibility to adapt to a shoe. The present invention also provides a rigid L-shaped element, each including a first portion on the ground side, a second portion on the side wall, and a fulcrum joining them, to clamp an inserted shoe. A double injection method for producing the above is also provided.

21 Claims, 10 Drawing Sheets

U.S. PATENT DOCUMENTS

| | | | |
|---|---|---|---|
| 3,026,635 A | 3/1962 | Slade | |
| 3,170,251 A | 2/1965 | Patrick | |
| 3,616,552 A | 11/1971 | Kniffln et al. | |
| 3,643,352 A | 2/1972 | Adair | |
| 3,763,578 A * | 10/1973 | Chadwell | 36/7.3 |
| 3,965,586 A * | 6/1976 | Roosli | 36/7.3 |
| 4,364,186 A | 12/1982 | Fukuoka | |
| 4,420,893 A | 12/1983 | Stephan | |
| 4,434,565 A | 3/1984 | Haley | |
| 4,494,324 A | 1/1985 | Spademan | |
| 4,499,672 A | 2/1985 | Kim | |
| 4,617,745 A | 10/1986 | Batra | |
| 4,633,597 A | 1/1987 | Shiang | |
| 4,654,982 A | 4/1987 | Lee | |
| 4,811,504 A * | 3/1989 | Bunke | 36/132 |
| 4,835,883 A | 6/1989 | Tetrault et al. | |
| 4,837,948 A | 6/1989 | Cho | |
| 4,860,463 A | 8/1989 | Pin | |
| 4,888,887 A | 12/1989 | Solow | |
| 4,924,605 A | 5/1990 | Spademan | |
| 4,939,851 A * | 7/1990 | Miller | 36/3 B |
| 5,010,661 A | 4/1991 | Chu | |
| 5,068,981 A | 12/1991 | Jung | |
| 5,138,775 A | 8/1992 | Chu | |
| 5,224,277 A | 7/1993 | Sang Do | |
| 5,282,324 A | 2/1994 | Cheng | |
| 5,295,313 A | 3/1994 | Lee | |
| 5,299,368 A | 4/1994 | Liu | |
| 5,311,678 A | 5/1994 | Spademan | |
| 5,333,397 A | 8/1994 | Hausch | |
| 5,341,581 A | 8/1994 | Huang | |
| 5,351,421 A | 10/1994 | Miers | |
| 5,375,345 A | 12/1994 | Djuric | |
| 5,396,717 A | 3/1995 | Bell | |
| 5,408,760 A | 4/1995 | Tse et al. | |
| 5,425,186 A | 6/1995 | Hoyt | |
| 5,444,926 A | 8/1995 | Allen et al. | |
| 5,505,010 A | 4/1996 | Fukuoka | |
| 5,606,806 A | 3/1997 | O'Dwyer | |
| 5,619,809 A | 4/1997 | Sessa | |
| 5,655,314 A | 8/1997 | Petracci | |
| 5,813,140 A | 9/1998 | Obeid | |
| 5,819,438 A | 10/1998 | Wanniarachchi | |
| 5,826,349 A | 10/1998 | Goss | |
| 5,845,417 A | 12/1998 | Reed et al. | |
| 5,845,418 A | 12/1998 | Chi et al. | |
| 5,860,225 A | 1/1999 | O'Dwyer | |
| 5,915,820 A | 6/1999 | Kraeuter et al. | |
| 5,918,381 A | 7/1999 | Landry | |
| 5,940,989 A | 8/1999 | Liou | |
| 5,953,835 A | 9/1999 | Kwon | |
| 5,975,861 A | 11/1999 | Shin et al. | |
| 5,979,076 A | 11/1999 | Li | |
| 5,996,250 A | 12/1999 | Reed et al. | |
| 6,006,447 A | 12/1999 | Neal et al. | |
| 6,041,519 A | 3/2000 | Cheng | |
| 6,044,577 A | 4/2000 | Clark | |
| 6,076,282 A | 6/2000 | Brue | |
| 6,085,444 A | 7/2000 | Cho | |
| 6,154,982 A | 12/2000 | Bell et al. | |
| 6,205,680 B1 | 3/2001 | Clark | |
| 6,247,248 B1 | 6/2001 | Clark | |
| 6,266,898 B1 | 7/2001 | Cheng | |
| 6,305,099 B1 | 10/2001 | Chu | |
| 6,305,100 B1 | 10/2001 | Komarnycky et al. | |
| 6,415,529 B1 | 7/2002 | Kelley | |
| 6,434,858 B2 | 8/2002 | Pan | |
| 6,446,359 B2 | 9/2002 | Tomat | |
| 6,463,679 B1 | 10/2002 | Buttigieg | |
| 6,467,191 B2 | 10/2002 | Hayashi et al. | |
| 6,477,789 B2 | 11/2002 | Cheng | |
| 6,481,121 B1 | 11/2002 | Tucker | |
| 6,564,475 B2 | 5/2003 | Collins et al. | |
| 6,568,101 B1 | 5/2003 | Jansen et al. | |
| D475,513 S | 6/2003 | Reynolds et al. | |
| 6,581,303 B1 | 6/2003 | Tuan | |
| 6,594,917 B2 | 7/2003 | Ricco' et al. | |
| 6,634,121 B2 * | 10/2003 | Sordi | 36/102 |
| 6,655,048 B2 | 12/2003 | Moretti | |
| 6,671,979 B2 | 1/2004 | Cardarelli | |
| 6,675,504 B1 | 1/2004 | Biancucci et al. | |
| 6,701,643 B2 | 3/2004 | Geer et al. | |
| 6,729,044 B2 | 5/2004 | Vello | |
| 6,739,074 B2 * | 5/2004 | Trommer | 36/1 |
| 6,751,890 B1 | 6/2004 | Tsai | |
| 6,836,977 B2 | 1/2005 | Larson | |
| 6,836,979 B2 * | 1/2005 | Flavio et al. | 36/103 |
| 6,860,035 B2 | 3/2005 | Girard | |
| 6,865,825 B2 | 3/2005 | Bailey, Sr. et al. | |
| 7,003,900 B2 * | 2/2006 | Trommer | 36/1 |
| 7,013,579 B2 | 3/2006 | Szczesuil et al. | |
| 7,013,581 B2 | 3/2006 | Greene et al. | |
| 7,055,264 B2 | 6/2006 | Gallegos | |
| 2001/0005947 A1 * | 7/2001 | Sordi | 36/102 |
| 2004/0148800 A1 * | 8/2004 | Nakano | 36/30 R |
| 2005/0126036 A1 * | 6/2005 | Wu | 36/3 B |
| 2005/0193596 A1 | 9/2005 | Culton et al. | |
| 2006/0288611 A1 * | 12/2006 | Hogan | 36/25 R |

* cited by examiner

ADAPTABLE SHOE COVER

FIELD OF THE INVENTION

The present invention generally relates to the field of shoe covers and more specifically to shoe covers having regions of differing rigidity and flexibility that enable improved adaptability as well as other desired properties.

BACKGROUND OF THE INVENTION

Shoe covers are an established technology for protecting shoes from environmental damage due to water, snow, dirt, salt and other chemicals, in order to give the wearer an improved functionality and protection. For instance, an improved grip may be achieved by providing a nonskid ability. Also, an improved fit may better protect the wearer and/or the shoe to be covered. Shoe covers—otherwise known as overshoes or galoshes—may be worn over a variety of shoe types, including dress shoes, golf shoes, sporting shoes, sneakers, boots, work boots, or any other type of footwear. They may also be worn directly over the sock or foot of a wearer.

Most shoe covers include an upper portion and a sole. The wearer inserts his or her shoe into an opening in the upper portion. The sole may be composed of front and back parts which may be separated by an arched portion.

To fulfill many of its functions and to increase the comfort of the wearer, a shoe cover should be able to fit properly over the shoe of the wearer. Known shoe covers have been made with flexible materials, usually thin rubber, and are frequently stretched over a shoe. A variety of types of stretchable shoe covers have been used to fit many different sizes of shoes, to improve the tightness of the fit and to facilitate the process of putting the shoe cover over the shoe. Shoe covers in the prior art have been additionally provided with corrugations, stretchable materials or other mechanical elements such as zippers or Velcro to improve the fit over a shoe. However, the shoe covers found in the prior art still present disadvantages, among which are adapting to shoes of differing sizes, providing satisfactory gripping ability and fitting properly throughout the gait and stride of a variety of wearers.

A particular shoe cover found in the prior art is disclosed by U.S. Pat. No. 6,568,101 B1 (JANSEN et al.). This patent describes a softspiked overshoe suitable for use when playing golf. This overshoe has a rigid sole provided with a checkered raised grid and softspikes disposed thereon. Furthermore, JANSEN et al. teach that the arch portion of the sole is provided with greater flexibility than the toe and heel portions of the sole, and that the toe and heel portions may be provided with greater rigidity than the upper portion of the shoe-covering. This variability in rigidity and flexibility enables the different regions to cooperate and allows the overshoe to adapt to some foot movements. However, this overshoe presents disadvantages as it does not take into account the fit over the entire shoe, but focuses only on certain parts of the overshoe.

The U.S. Pat. No. 3,026,635 (SLADE) describes an elastomeric overshoe having a plurality of spaced corrugations on the arch portion of the sole as well as a plurality of vertical corrugations on the upper part of the overshoe. The corrugations may be flattened and compressed to provide flexibility and fitting ability to the overshoe.

The U.S. Pat. No. 5,425,186 (HOYT) describes an overshoe with an accordion-type sole. HOYT teaches a sole with horizontal corrugations ("accordion-like configuration") on the heel and toe portions thereof, thus enabling the sole to stretch longitudinally to facilitate putting it on a shoe while maintaining a certain level of rigidity.

The U.S. Pat. No. 5,396,717 (BELL) describes a convertible overshoe with tear resistant bead. BELL teaches that the overshoe may have thinner sidewall portions having a trim line at their upper part, which attaches to an upper portion. The thinner sidewall portions enable the overshoe to accommodate a larger primary shoe, but still present disadvantages such as its fit and adapting ability when walking.

Other patents such as U.S. Pat. No. 6,675,504 B1, U.S. Pat. No. 4,434,565 and U.S. Pat. No. 2,068,238; describe various types of shoe covers having an upper part and a sole, the sole being separated into two parts by an arched portion and possibly provided with spikes or other traction means.

However, as is known to a person skilled in the art, the shoe covers found in the prior art present numerous disadvantages and inefficiencies, and there is currently a need for improvement in this field.

SUMMARY OF THE INVENTION

The present invention provides a shoe cover that responds to the above mentioned need.

Accordingly, the present invention provides a shoe cover including a sole made of a flexible material. The sole has at least two rigid bands made of rigid material, each having a first portion disposed on a ground contactable side of the sole and arranged in spaced relation to each other on opposite sides of a longitudinal axis of the sole, thereby rigidifying the sole. The sole also has at least one elastic band made of the flexible material, spanning longitudinally between said at least two first portions from a front end to a rear end of the sole, thereby enabling the sole to be laterally flexible to adapt to a shoe over which the shoe cover fits.

In accordance with a preferred embodiment, each of the rigid bands comprises a second portion extending upward along a side wall of the shoe cover, and a fulcrum joining the first and second portions. The first and second portions have an angle α therebetween enabling the second portion to be inwardly biasable for clamping a shoe inserted in the shoe cover and improving an adaptive fit of the shoe cover.

Furthermore, the present invention provides a double-injection method of fabricating a shoe cover, including the steps of:
(a) injecting into a first mold a first layer having a thickness enabling flexibility and being in a form having a sole and an upper portion, the upper portion having an opening therein for inserting a shoe;
(b) sufficiently cooling the first layer;
(c) placing the first layer into a second mold; and
(d) injecting into the second mold a second layer on predetermined outer surfaces of the first layer, said predetermined surfaces comprising two bands on the ground contactable side of the sole and arranged in spaced relation to each other on opposite sides of a longitudinal axis of the sole, thereby defining an elastic band therebetween consisting essentially of the first layer and spanning longitudinally from a front end to a rear end of the sole, the second layer being of a material having a density sufficient to provide rigidity while the elastic band enables the sole to be laterally flexible.

BRIEF DESCRIPTION OF THE DRAWINGS

The invention and its advantages will become more apparent upon reading the detailed description and upon referring to the drawings in which.

Figure 1:
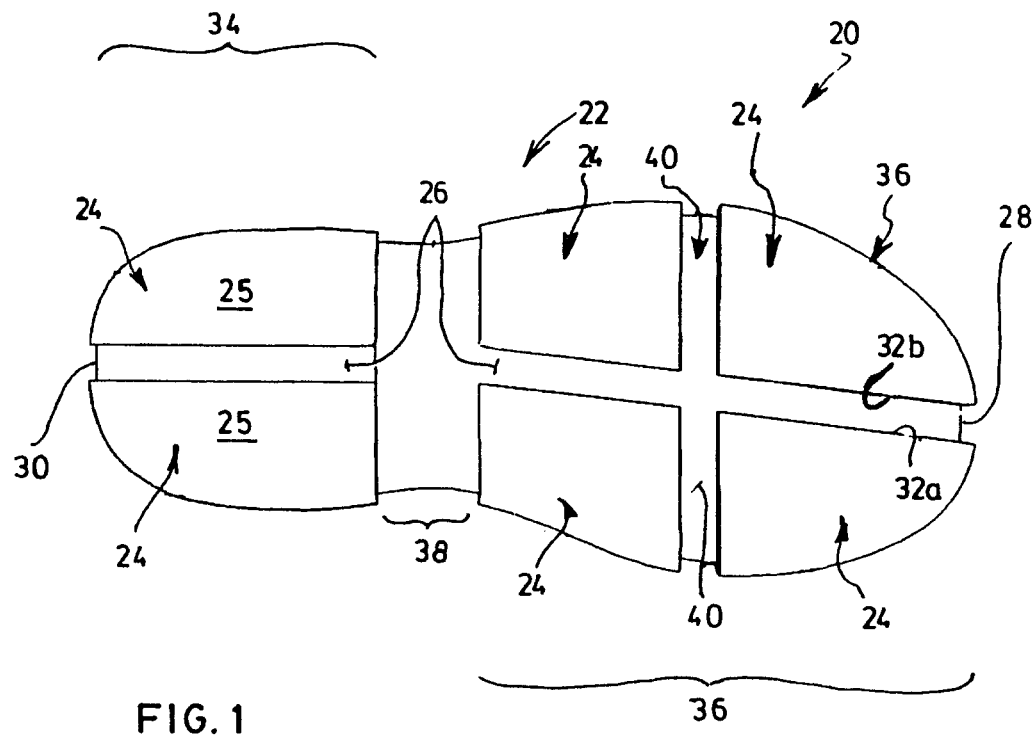
FIG. 1 is a bottom plan view of an embodiment of the shoe cover of the present invention.
Figure 2:
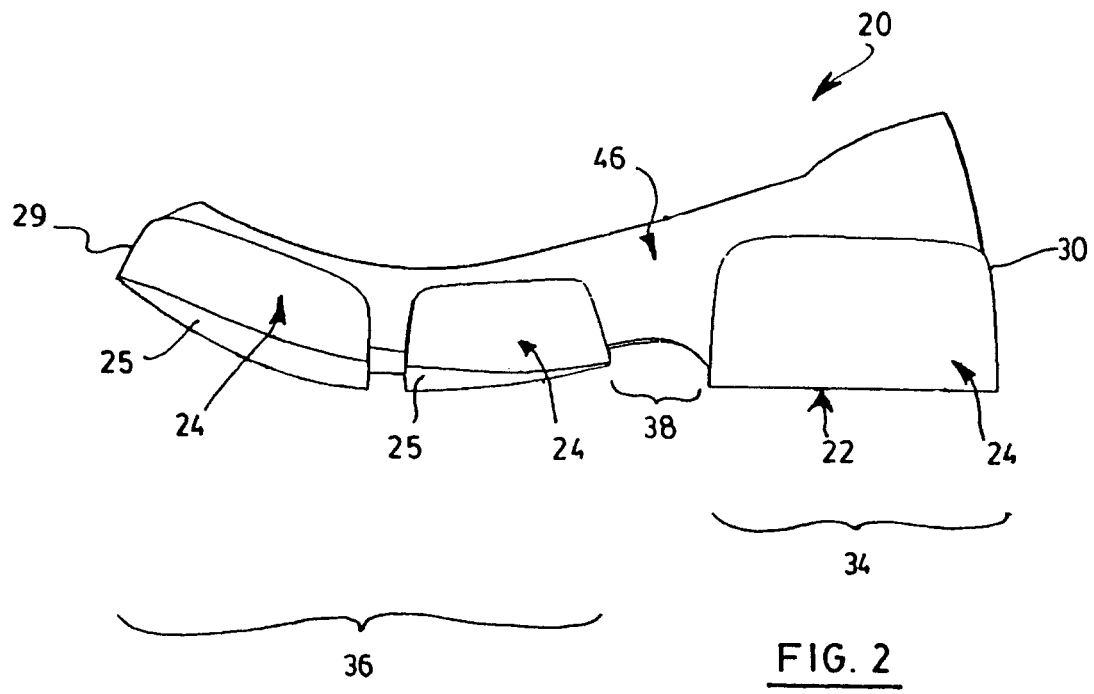
FIG. 2 is a side perspective view of the shoe cover of FIG. 1.

While the invention will be described in conjunction with certain embodiments and variants thereof, it will be understood that it is not intended to limit the scope of the invention to such embodiments or variants. On the contrary, it is intended to cover all alternatives, modifications and equivalents as may be included as defined by the appended claims.

DESCRIPTION OF PREFERRED EMBODIMENTS

In the following description, similar features in the drawings have been given similar reference numerals in order not to unduly weigh down the figures. Also, some elements are not referred to in some Figs if they were already identified in a precedent Fig.

The shoe cover according to the present invention may cover a variety of shoes, socks or bare feet, depending on the desired use. For example, the shoe cover may fit over dress shoes, loafers, boots, sneakers, running shoes or golf shoes, as well as over feet with a sock in between or not.

Referring to any one of FIGS. 1, 3-7, 9 and 11 to 14, the shoe cover 20 according to the present invention includes a sole 22 made of a flexible material. The sole 22 has at least one pair of bands 24 made of rigid material, each band of the pair having a first portion 25 disposed on a ground contacting side of the sole 22 and arranged in spaced relation to each other on opposite sides of a longitudinal axis of the sole, thereby rigidifying the sole 22. Preferably, the first portions 25 of each pair of rigid bands 24 are arranged in parallel relation relative to each other, and may extend to varying degrees along the length of the sole, as will be discussed herebelow. The embodiments shown in FIGS. 1, 3 to 6, 9, 11 to 12 and 14 comprise three of these pairs of rigid bands 24, one pair at a heel section 34 (also referred to as the rear end section) and two in a toe section 36 (also referred to as the front end region) of the sole 22, whereas the embodiments shown in FIG. 7 or 13 comprise two of these pairs, one at the heel section 34 and the other at the toe section 36.

In each case, an elastic band 26 made of the same flexible material spans longitudinally between the first portions 25 of each pair of bands from a front end 28 to a rear end 30 of the sole 22, thereby enabling the sole 22 to be laterally flexible to adapt to a shoe (not shown) over which the shoe cover 20 fits. The elastic band 26 preferably has a width that depends on the flexibility required and the material used. The elastic band 26 thus defines a specific stress-strain region in which the strain focus is amplified when the sole is stretched laterally. The rigid bands 24 thus enable the shoe cover to display selective flexibility, that is, predetermined stress-strain characteristics in predetermined areas of the shoe cover. Of course, the particular rigidity of the rigid bands 24 and the flexibility of the elastic band 26 may be adjusted by a person skilled in the art.

The first portions 25 may take on a variety of embodiments and may be provided at a variety of locations on the shoe cover 20, depending on the desired functionality and intended use of the shoe cover. As would be appreciable by a person skilled in the art, there may be a plurality of pairs of rigid bands 24 arranged in strategic points on the sole of the shoe cover. The elastic band 26 may also have a variety of forms as defined between the medial edges 32a, 32b of the first portions 25, which may be symmetrical or not.

The elastic band 26 preferably extends from the extremity of the front end 28 to the extremity of the rear end 30, as shown in FIG. 1. However, the elastic band 26 may also extend along a predetermined longitudinal length of the sole 22 between the first portions 25, to provide lateral flexibility between the bands along said predetermined longitudinal length. It is also preferable that the elastic band 26 be made of the same flexible material as the rest of the sole.

As best seen from FIG. 1, the sole 22 further comprises an arch 38 section composed only of the flexible material. This arch 38 provides an ergonomic fit to the soles of a variety of shoes. The arch 38 may also improve the shoe cover's flexibility in the longitudinal direction. Alternatively, the sole 22 may be relatively flat, especially when the shoe to be covered has a flat bottom.

Between the pairs of rigid bands 25, there is preferably a transverse elastic band 40 crossing the longitudinal axis and separating the first portions 25 of the rigid bands. The flexible arch 38 also acts as such a separation. These transverse elastic bands 40 facilitate the longitudinal flexibility and further improve adaptability of the shoe cover.

Figure 7:
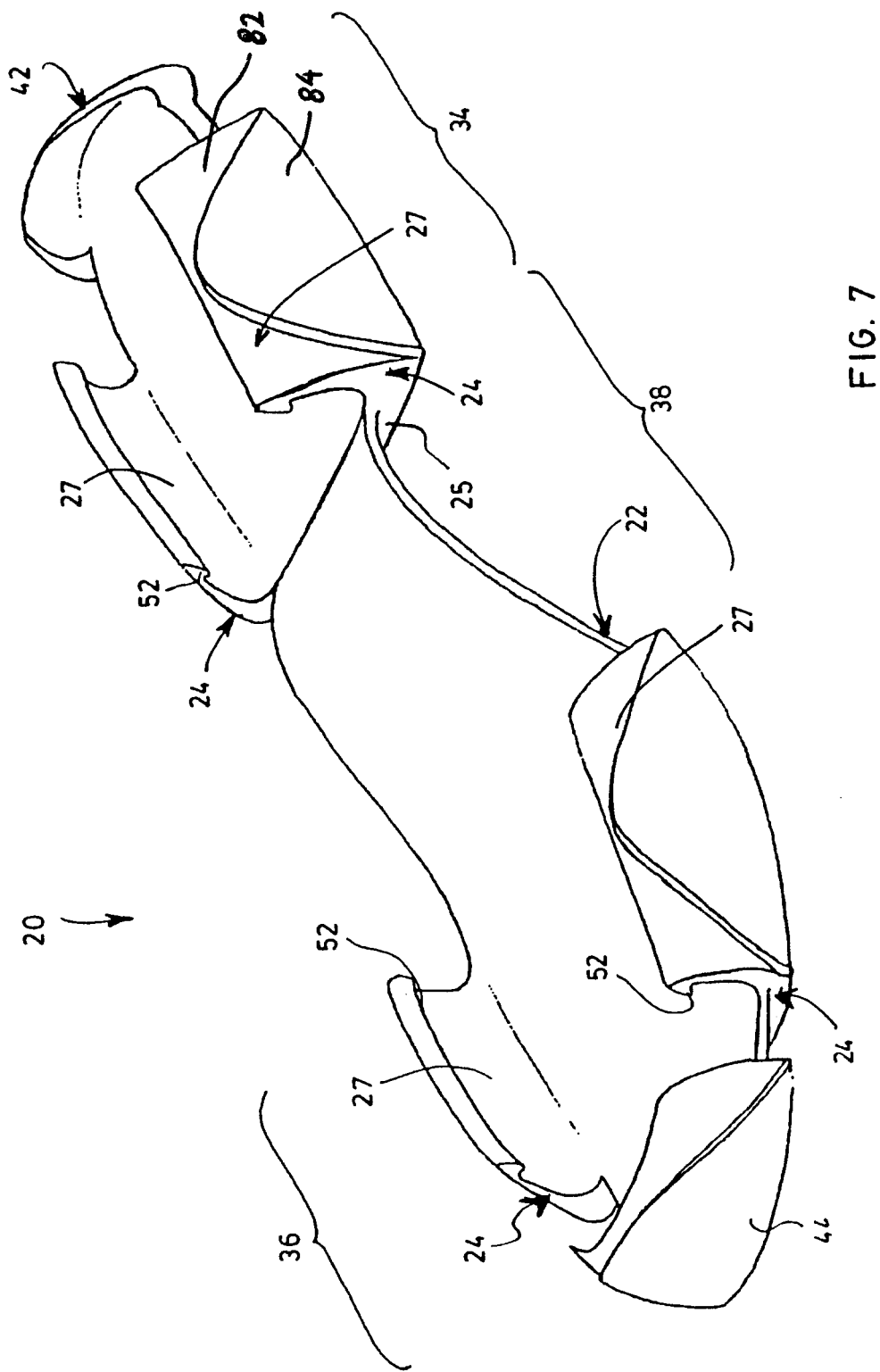
FIG. 7 is a top perspective view of a still further embodiment of the shoe cover of the present invention.

Referring briefly now to FIG. 7, in one embodiment of the shoe cover, the heel section 34 preferably further includes a rigid heel element 42 provided at the rear end 30 of the sole 22. The rigid heel element 42 is in spaced relation with a neighbouring pair of rigid bands 24, thereby rigidifying the heel end of the sole. Similarly, the toe section 36 preferably comprises a rigid toe element 44 which is provided at the front end 28 of the sole 22. The rigid toe element 44 is in spaced relation with a neighbouring pair of rigid bands 24, thereby rigidifying the toe end of the sole 22. Though the rigid heel element 42 and rigid toe element 44 are shown here on the embodiment of a sole cover, they may be included in any of the other embodiments shown in the Figs or discussed herein.

A shoe cover according to the invention may take the shape of a traditional overshoe that includes a complete side wall 46 made of flexible material integrally connected to the sole 22 and extending from the front end 28 to the rear end 30 to cover the side parts of a shoe or boot. The embodiments shown in FIGS. 2, 3, 4, 6, 9, 11-14 are examples of such variants. In these cases, the side wall 46 defines a cavity allowing the shoe (not shown) to be inserted therethrough. The side walls 46 aid in keeping the shoe cover 20 around the shoe.

Figure 6:
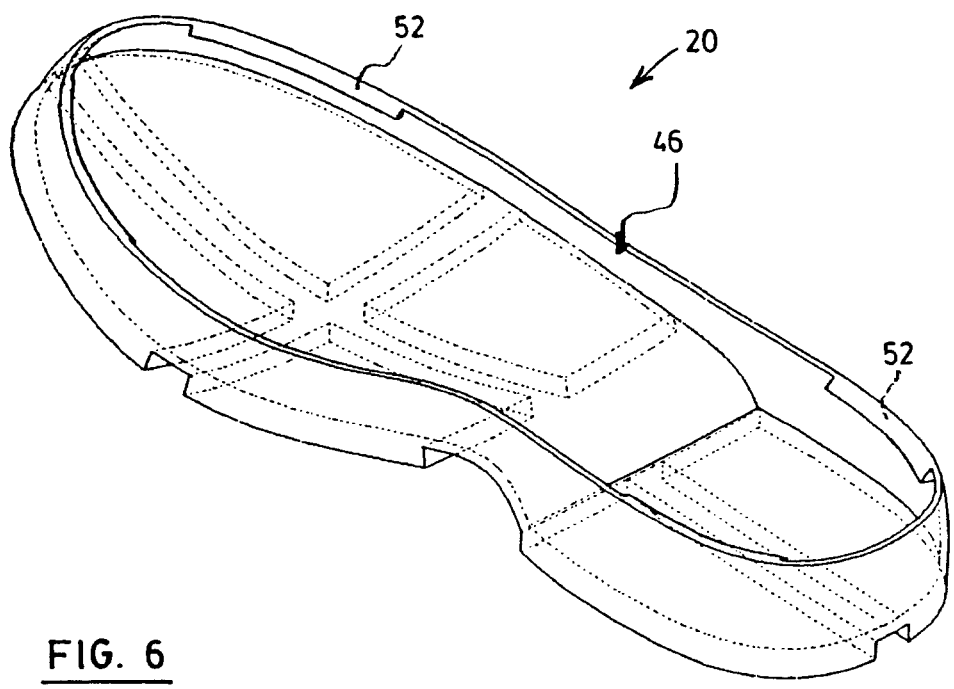
FIG. 6 is a top perspective view of a further embodiment of the shoe cover of the present invention.

The side wall 46 may be quite short, as in FIG. 6, to extend up only a part of the side of the shoe (e.g. over the sole ridge). This may be advantageous to increase the retaining capability of the overshoe to the shoe.

Figure 5:
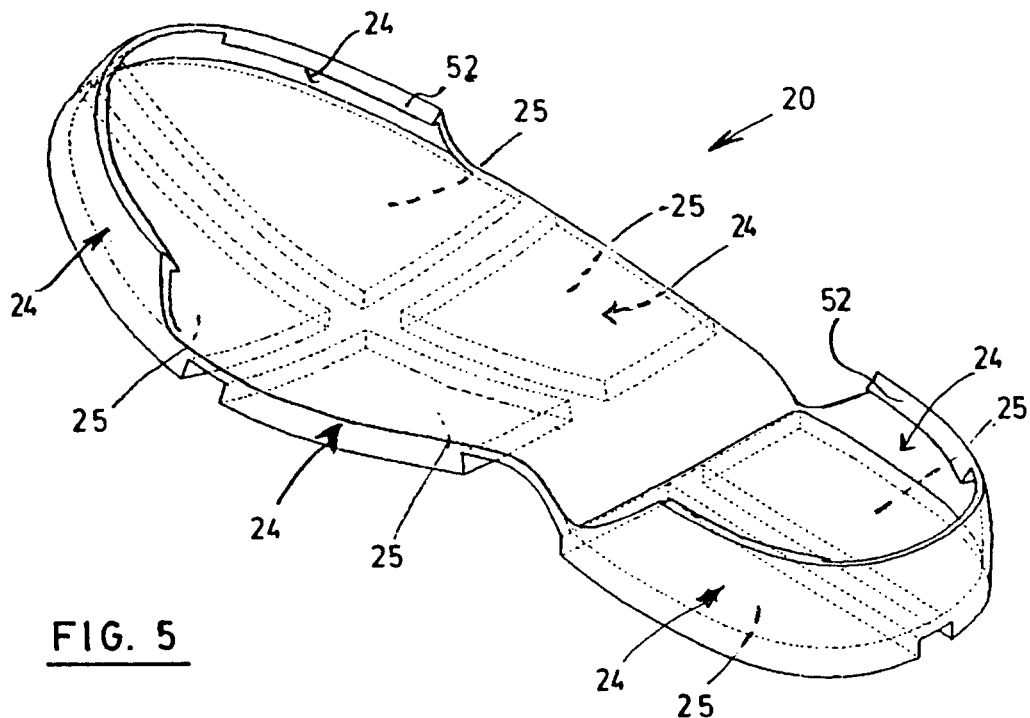
FIG. 5 is a top perspective view of still another embodiment of the shoe cover of the present invention.

The shoe cover according to the invention may also take the shape of a sole-cover, as in FIGS. 5 or 7. In that case, the side walls 46 only span the toe section 36 and the heel section 36 of the shoe cover 22. This embodiment will be described in further details hereinbelow.

Figure 3:
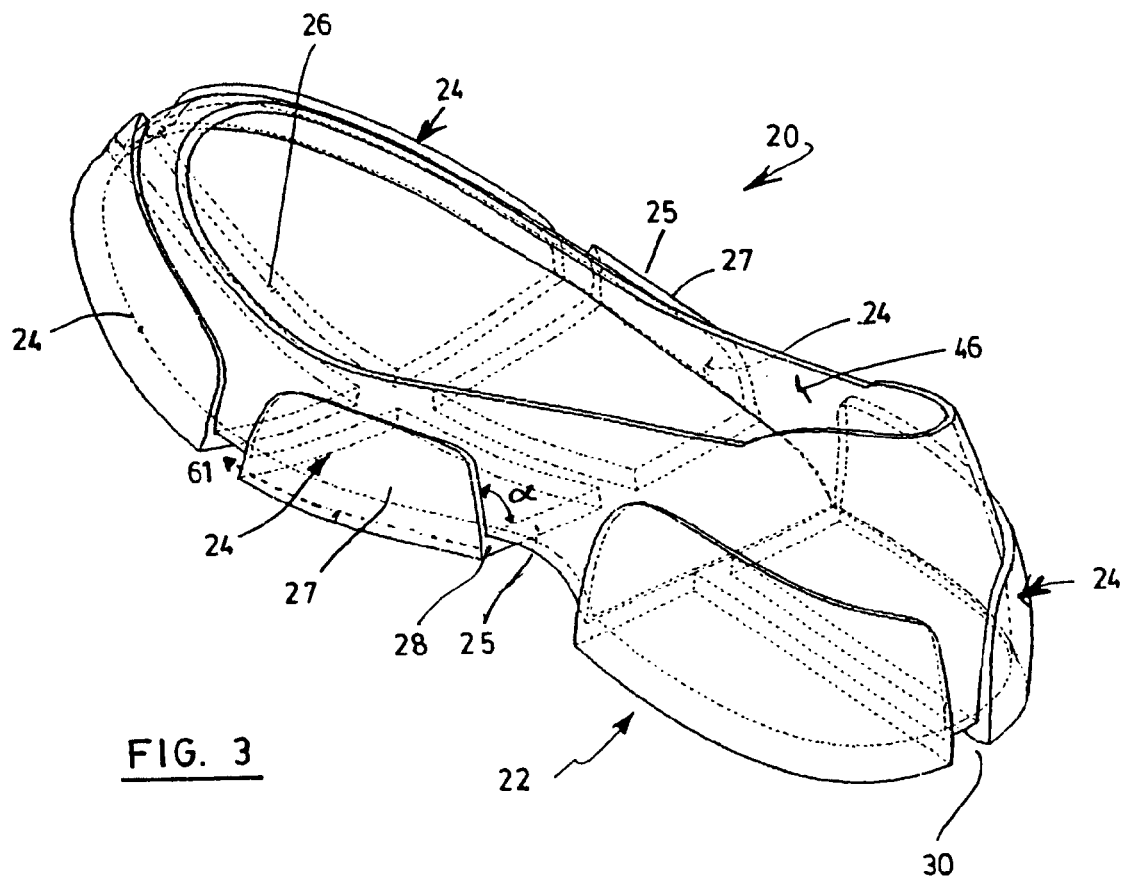
FIG. 3 is a top perspective view of the shoe cover of FIG. 1.

As best shown in FIG. 3, and in order to further improve the fit of the shoe cover, all or some of the rigid bands 24 preferably take the form of an L-shaped element including, in addition to the first portion 25 described above, a second portion 27 extending from the first portion 25 upward along the side wall of the shoe cover, so as to form the rigid L-shaped element. The first and second portions 25, 27 are attached at fulcrum 28. The angle α between the first and second portions 25, 27 is chosen so as to enable the second portion 27 to be inwardly biasable for clamping a shoe inserted in the shoe cover 20 and improving an adaptive fit of the shoe cover 20.

Figure 8A:
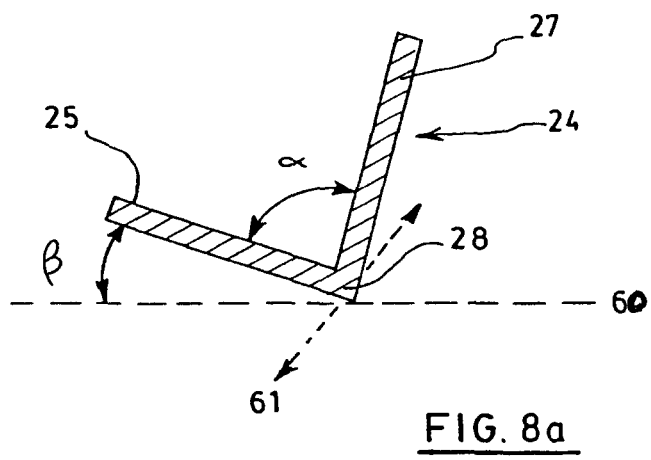
FIG. 8a is a schematic front isolation view of a rigid L-shaped element of a shoe cover in a relaxed position.
Figure 8B:
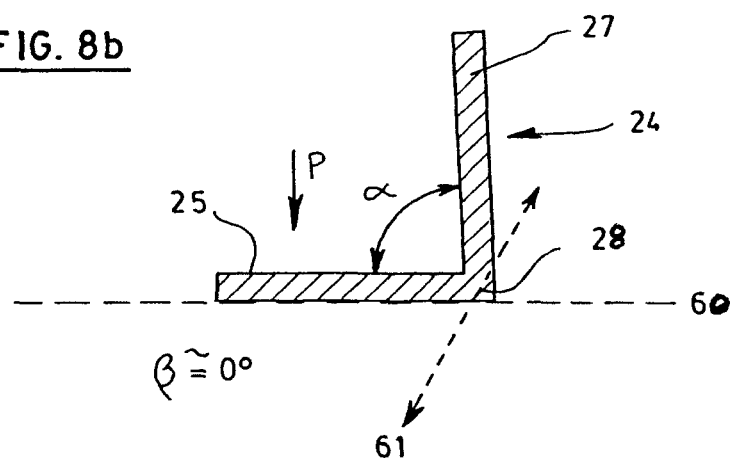
FIG. 8b is the same view, or FIG. 8a showing the rigid L-shaped element after having rotated in response to a downward pressure.

Referring now to FIGS. 8a and 8b, the angle α may be seen between the first and second portions 25, 27. This angle α is preferably less than about 90°, the second portion 27 thereby being inwardly biasable and pivotable against the shoe for clamping the shoe inserted within the shoe cover 20. Still preferably, the angle α is between about 85° and about 45°, and may be determined by a person skilled in the art depending on materials used and applications of the shoe cover. By changing the angle α and the material's stiffness, one can tune the contact force at the top of second portion 27. FIG. 8a shows the rigid band 24 in a relaxed position when the wearer's foot is not exerting a pressure. In this position, the first portion 25 is angled with respect to a horizontal plane 60 and defines an angle β with the horizontal plane 60 that is more than about 0°, thereby enabling the second portion 27 to rotate about an axis 61 of the fulcrum 28 and toward a side wall of the shoe inserted within the shoe cover 20 to an inward position when a downward pressure (P) is exerted on the first portion 25. FIG. 8b shows this inward position of the second portion 27, when the first portion 25 has been brought to be flush with the ground. The angle β of the first portion 25 is preferably between about 5° and about 30°, but may be determined by a person skilled in the art.

It should also be understood that the rigid L-shaped elements are provided on the shoe cover at predetermined locations, and preferably conforming to the shape of those locations. As the L-shaped elements may be curved with the periphery and surface of the shoe cover, the angles α and β may be varied within the same L-shaped element. Thus, for example, an angle α may be greater nearer one end of the L-shaped element than the other. The first and second portions 25, 27 may be curved, or flat, to adapt to the shoe and/or have the desired effect.

Referring to FIG. 3, the rigid band 24 are preferably used in pairs, wherein they are arranged on opposite sides of the shoe cover 20. In each pair, the first portions 25 are separated by the elastic band 26. The elastic band 26 thus facilitates the clamping ability of the L-shaped elements by stretching laterally when a downward pressure is brought on the first portions 25. The pressure on the first portions 25 causes the L-shaped rigid band 24 to rotate about the fulcrum axis 61, to bias the second portion 27 inwardly (i.e. medially). The two opposite second portions 27 thus exert opposite inward biasing forces on the shoe. The shoe may thus be clamped from both sides by opposite rigid L-shaped elements 24, to provide an advantageously adaptive fit.

Alternatively, one rigid band 24 with an L shape may be arranged on other parts of the shoe cover 20 so that its first portion 25 may be pressed downward. For example, an L-shaped band may be arranged on an extremity of the toe portion 36 of the shoe cover 20 to clamp the toe part of the shoe. Likewise, an L-shaped band 24 may be arranged on an extremity of the heel portion 34 of the shoe cover 20 to clamp the heel part of the shoe. Of course, both heel and toe L-shaped elements 24 may be provided.

Figure 16:
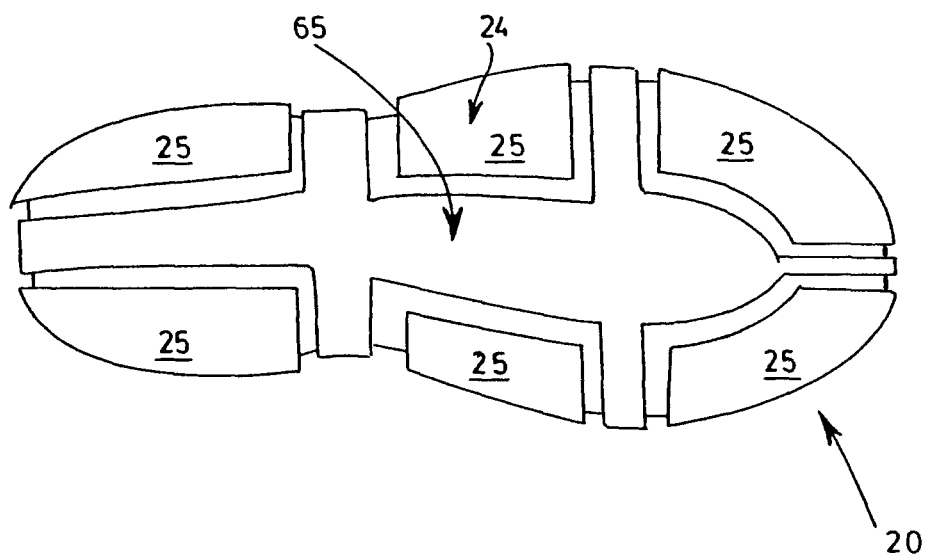
FIG. 16 is a bottom plan view of another embodiment of the present invention.

In another embodiment best shown in FIG. 16, the sole has a rigid central section 65 around the periphery of which is flexible material of the sole. The flexible portions thus border on the first portions 25 of the rigid L-shaped elements 24, to enable the clamping action thereof. The addition of this rigid central section 65 therefore does not disable the effect of the L-shaped elements, but rather serves to reinforce the sole and concentrate the strains in the flexible portions.

It should be understood that the different parts of the sole and side wall of the shoe cover need to be made of flexible material insofar as these flexible parts thereof enable the clamping action of the L-shaped elements.

Figure 9:
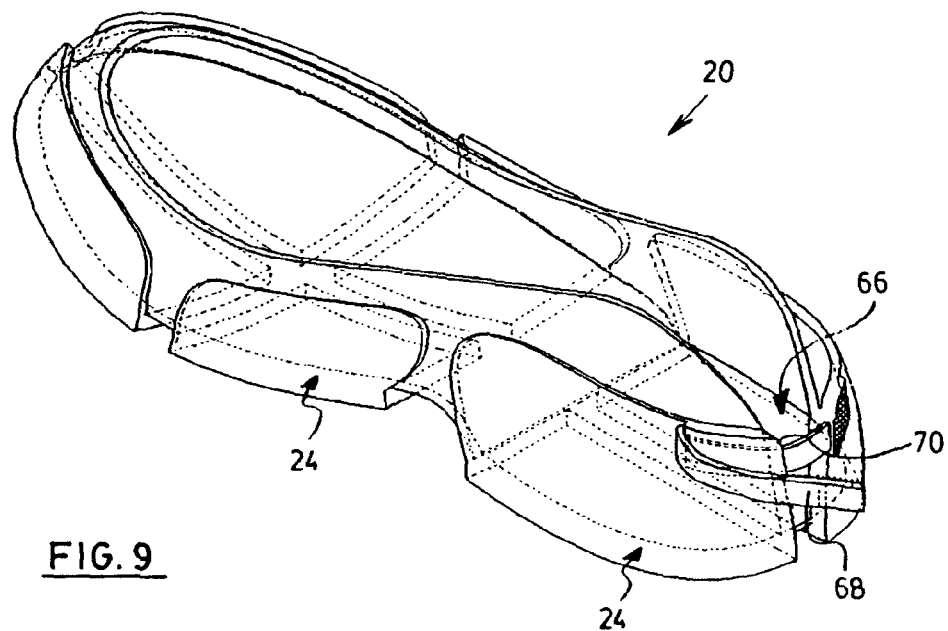
FIG. 9 is a top perspective view of a still further embodiment of the shoe cover of the present invention, with retention means.

Referring to FIG. 9, the rigid band 24 having an L-shaped configuration is preferably provided with retention means 66 for retaining the second portion 27 in the inward position. The retention means may take on a variety of embodiments as may be appreciated by a person skilled in the art.

Figure 10:
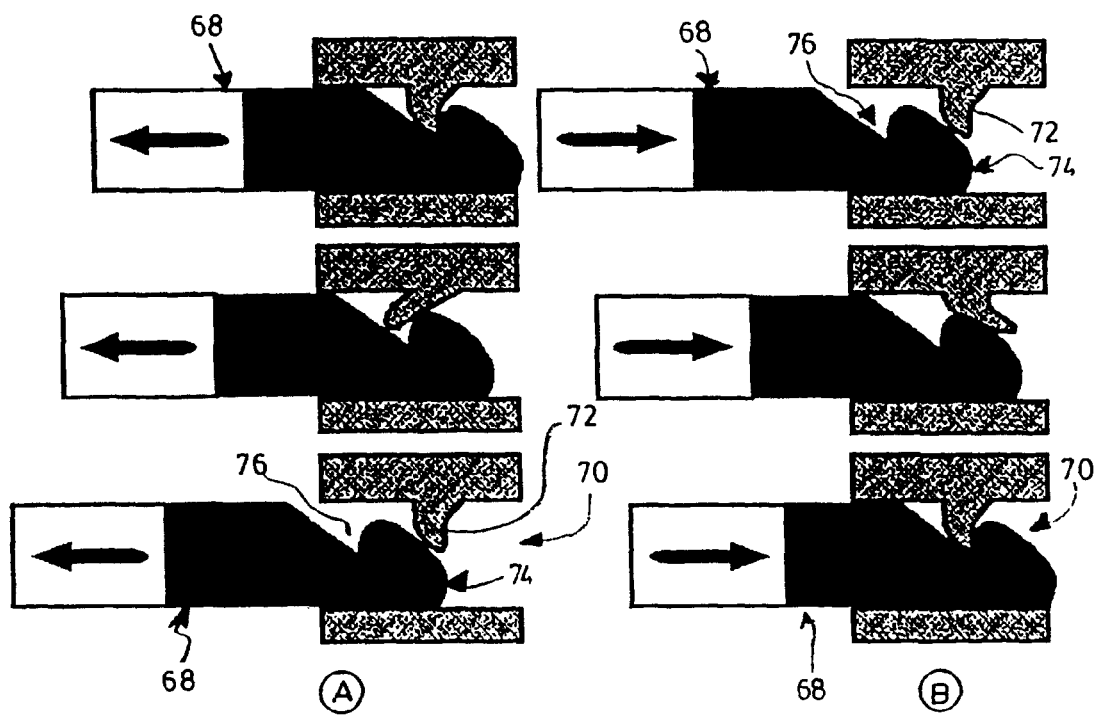
FIG. 10 is a series of back view isolation schematics showing the operation of retention means.

For example, in referring to FIG. 10, the retention means 66 may be a strap-and-lock system. In this system, a strap 68 is slid through a channel 70 in the second portion 27. The channel 70 has a projection 72 provided therein, and the strap 68 has a latch member 74 including a recess 76. The latch member 74 engages the projection 72 and the latter fits into the recess 76, as can be seen in the series B of FIG. 10. Series A, on the other hand, shows that the latch member 74 may be pulled upon and thus disengaged from the projection 72.

Figure 11:
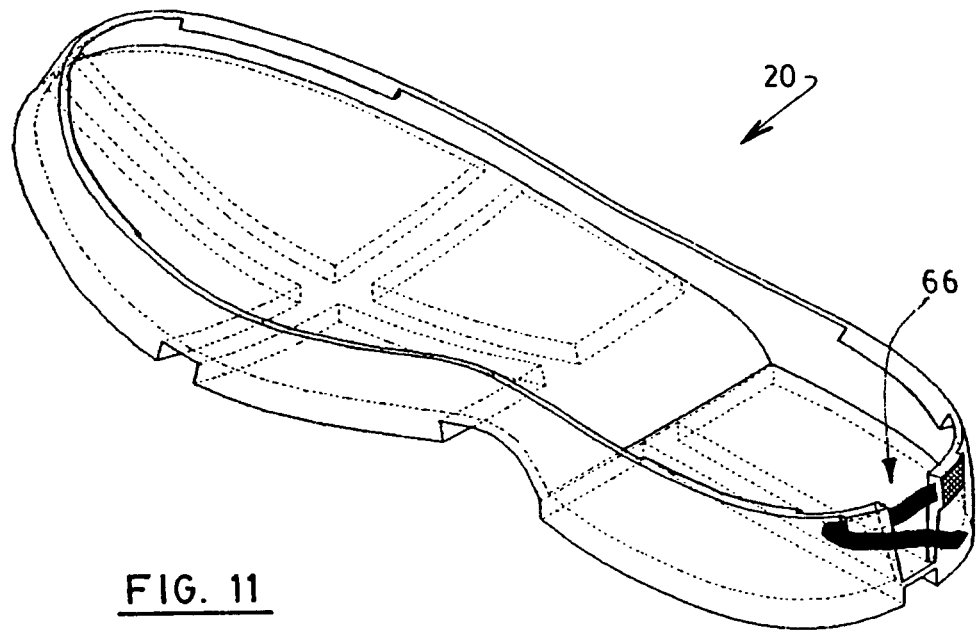
FIG. 11 is a top perspective view of an embodiment of the shoe cover of the present invention, with retention means.
Figure 12:
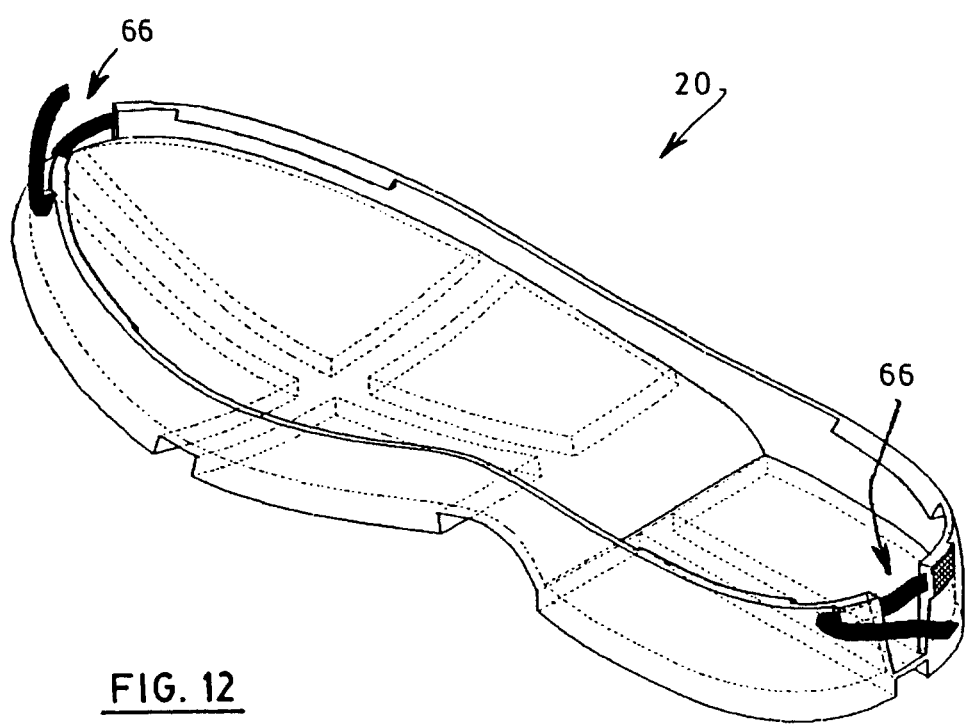
FIG. 12 is a top perspective view of another embodiment of the shoe cover of the present invention, with two retention means.

The sole cover 20 shown in FIG. 11 includes one of said retention means provided at the rear end 30, whereas the sole cover shown in FIG. 12 is provided with two of said retention means, one at the read end 30 and the other one at the front end 28.

Figure 15:
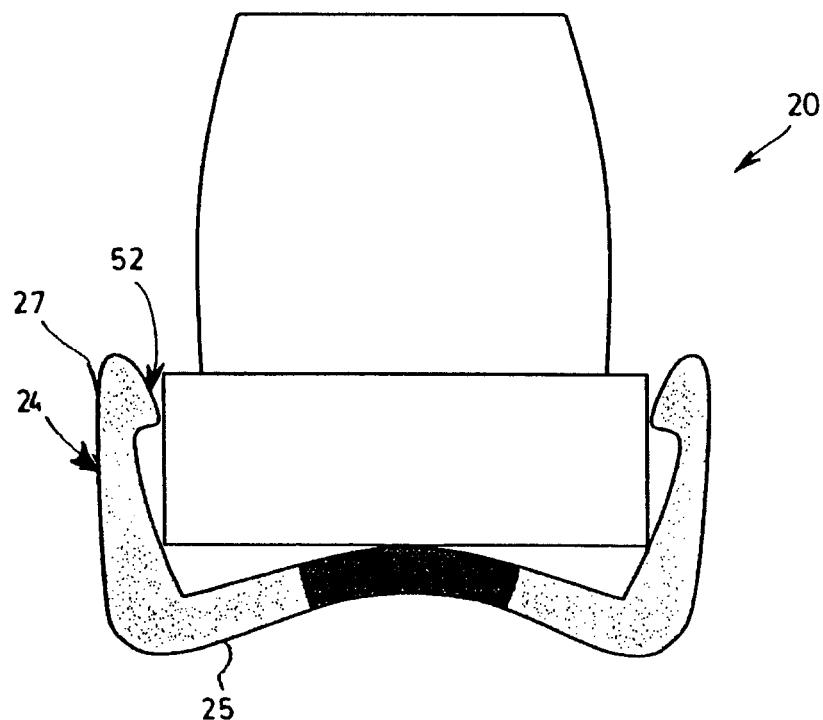
FIGS. 15a and 15b are back views of an embodiment of the shoe cover, showing a shoe in a latched and an unlatched state, respectively.
Figure 15:
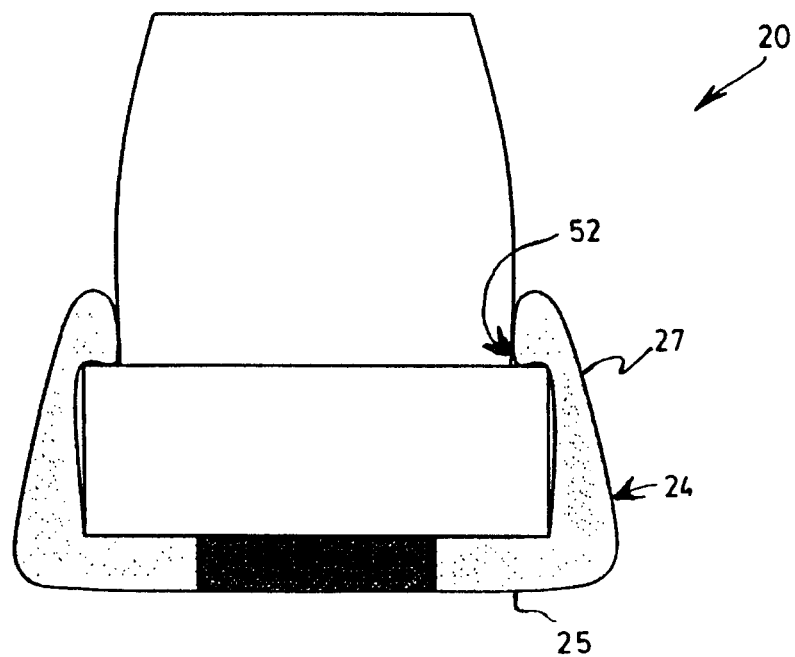

Another example or retention means is shown in FIGS. 7, 15a and 15b. In that case, the retention means includes an overhanging ridge element 52 provided on the second portion 27 for latching onto a part of the shoe. Preferably, when the second portion 27 is in the inwardly biasing position the ridge member 52 latches onto the shoe or the sole (as shown in FIG. 15b), depending on whether the shoe cover is to cover the entire shoe or only the sole thereof.

Alternative retention means include a string operatively connected to the second portion, the string being tightenable to a predetermined tightness to exert an inward force on the second portion and fastening means for fastening the string to the predetermined tightness. A second alternative is a retention means including a one way latch mechanism operatively connected to the first portion, the latch mechanism having a male element and a female element, wherein the male element is slidable within the female element in a first direction and is latchable with respect to the female element in a second direction opposite the first direction, the male element being displaceable in the first direction by the first portion when the second portion is displaced to inwardly bias the shoe, thereby latchably retaining the second portion in the inwardly biasing position.

The retention means is not limited to the above described embodiments. For instance, a variety of latches, hooks and/or strings may be employed and simply arranged to effectuate the required retention. Of course, it should also be understood that the presence of the retention means is preferable, and that alternatively the rigid band 25 in the L-shaped variant may function without retention means.

Figure 4:
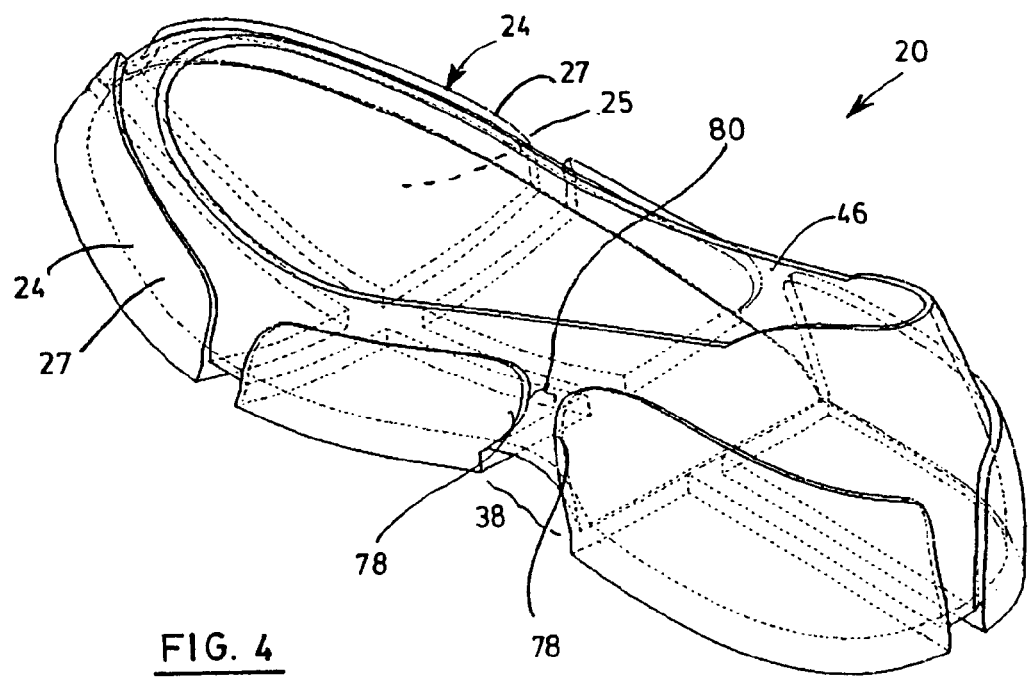
FIG. 4 is a top perspective view of another embodiment of the shoe cover of the present invention.

Turning now to FIG. 4, two of the L-shaped rigid bands 24, arranged in adjacent relationship on the same side of the shoe cover 20 are each provided with a rigid flap 78 at the arch level 38. The flaps 78 extend along the side wall 46 of the shoe cover toward each other while remaining unconnected and separated by a flexible interspace 80. The rigid flaps 78 enable an inward biasing of the interspace 80 during walking, and thereby substantially reduce outward kinking of the side of the shoe cover 20. This reduction in the "kinking" of the side portion of the shoe cover 20 is rather advantageous in improving the adaptive fit of the shoe cover 20. When the wearer is walking, and especially at the point in his stride when only the toe section 36 is touching the ground, the compression forces on the interspace 80 are elevated and encourage the formation of the kink. However, the flaps 78 help bias the interspace 80 inwards, during this and other points of the wearer's stride.

The interspace 80 is made of flexible material and is a region where strains are more significant when inserting the shoe cover over the shoe, while the adjacent rigid regions experience lower strain due to their increased stiffness. For example, at rest the interspace 80 and the flaps 78 experience virtually no stress and no strain. On the one hand, when the wearer is longitudinally stretching the shoe cover 20 to insert a shoe therein, the interspace 80 (along with the other flexible regions of the shoe cover) undergoes extensional strain, while the rigid regions undergo very little strain. On the other hand, when the wearer is in the stage of his stride when his toes are pushing off the ground, the longitidunal dimension of the shoe cover relaxes and the interspace 80 tends to come back to its original length, while again the rigid portions undergo little strain reduction. If the interspace 80 has been sufficiently stretched, then when pushing off the ground, the interspace may remain stretched and thereby avoid the formation of gaps or kinks in the area. In fact, there are many flexible zones and rigid zones arranged all over the shoe cover, and the flexible zones may undergo a similar kind of amplified and focused stress-strain behavior at different stages of the wearer's stride or when the wearer inserts or removes the shoe cover. The specific regions of amplified stress-strain depend on the materials used, the arrangement of the flexible and rigid zones (that is, zones with different flexibilities that include many of the above mentioned elements), and the movement of the shoe cover, but may be determined by a person skilled in the art for desired applications and effects. Thus, strategic placement of different densities and stiffnesses of material on the shoe cover enables increased multidirectional (or predetermined directional) adaptability and improved fit even during the pushing off phase.

It should also be understood that, in general, virtually any concave surface—such as the arch portion, an ankle portion, etc.—of the shoe, may be tightly fitted by the shoe cover by having rigid flaps extending toward the center of the concavity, while having a flexible interspace at the center thereof. This enables the shoe cover to effectively and tightly fit to concave surfaces, diminishing gaps and kinks all over the shoe cover.

Figure 14:
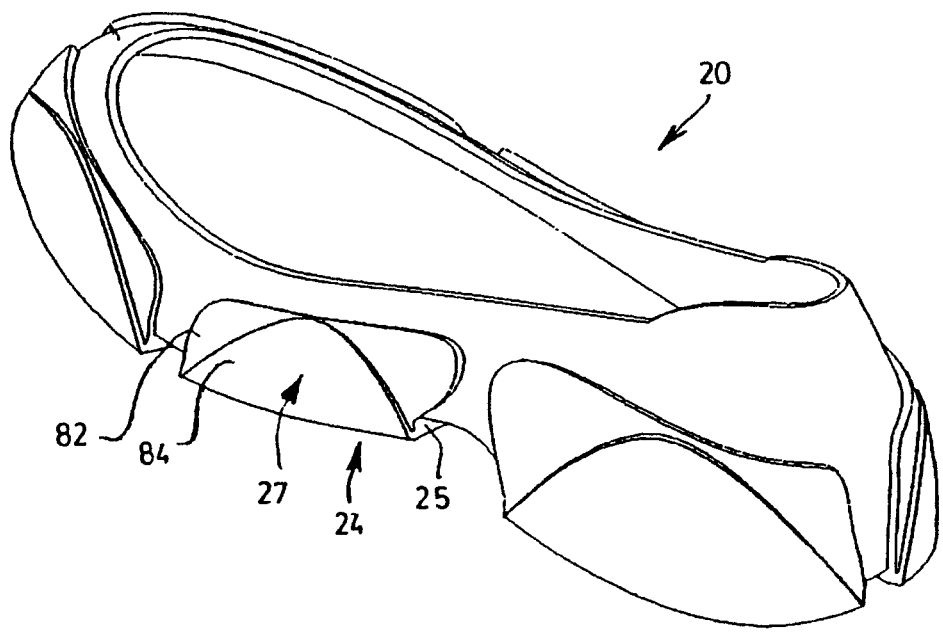
FIG. 14 is a top perspective view of still another embodiment of the shoe cover of the present invention.
Figure 13:
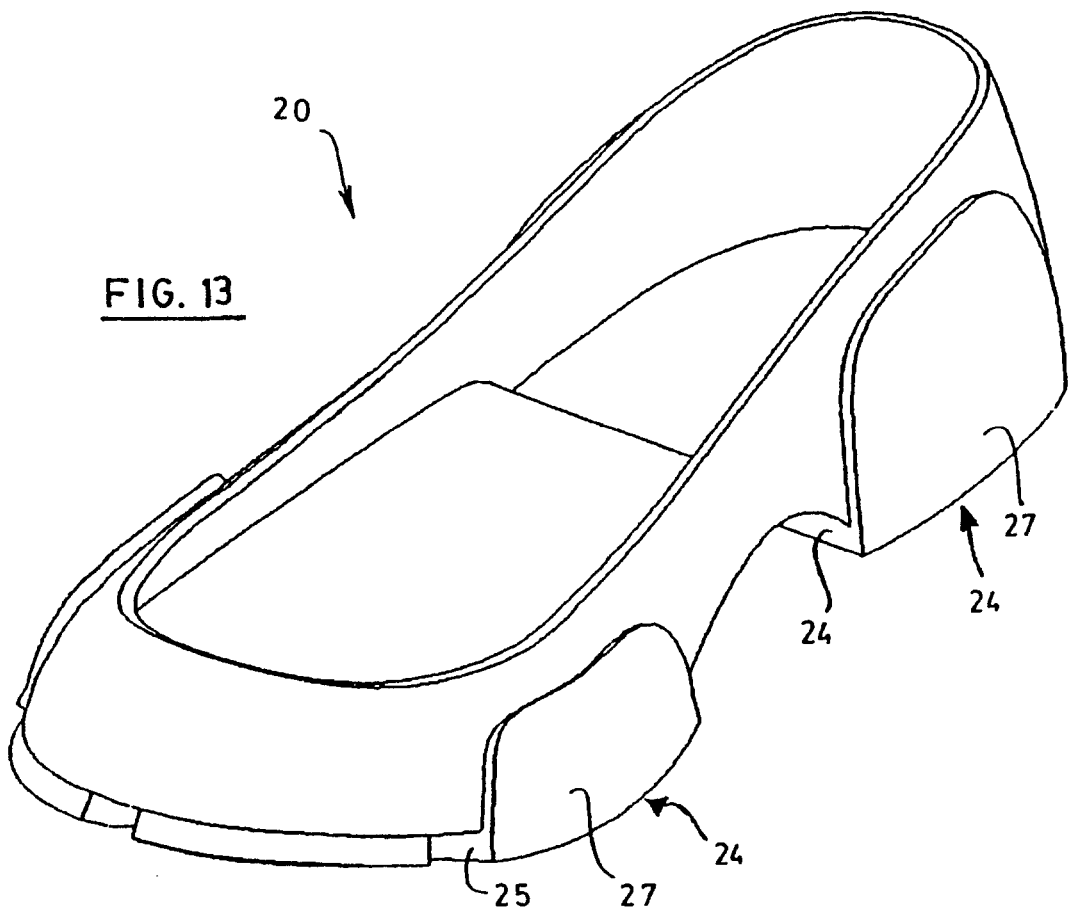
FIG. 13 is a top perspective view of yet another embodiment of the shoe cover of the present invention.

Now referring to either one of FIGS. 7 and 14, the second portions 27 of the rigid band 24 preferably comprise a first layer 82 provided on and extending up the side wall of the shoe cover 20, and a second layer 84 provided on the first layer 82 in a predetermined area, the second layer 84 additionally rigidifying the second portion 27 in the predetermined area. In the Fig, the second layer 84 has an inverted parabolic shape. Having dual layers may provide such advantages as the ability to pre-select specific regions of the side walls to reinforce and rigidify, to save on materials, and to vary the rigidity of the second portion 28 to provide various fits depending on materials and applications.

Preferably, the sole 22 of the shoe cover 20 is provided with gripping means to improve traction. The gripping means may be chosen from a variety of means known in the art, including a gripping pattern of ridges and/or bosses, a spider-web pattern such as that described in industrial design application no. CA 114360 entitled "SHOE COVER SOLE", as well as hard or soft spikes that are fixedly or removably mounted to the sole. Preferably, the gripping means improves security and/or performance in slippery conditions where there is a necessity for increased adherence. Preferably, the gripping means are provided on the rigid portions of the sole, but may also be provided on other portions.

Preferably, the thickness of the material varies at different locations of the shoe cover in order to provide particular stress-strain behavior, for improved fit, adaptability and retaining capability.

The rigid zones provide other advantages. For instance, the rigid bands 24 may increase the durability of the sole. Also, the rigid second portions 27 of the rigid bands 24 may improve the lateral stability of the shoe cover as well as increase the strength of the side walls to avoid lateral wall buckling (e.g. avoid a kink when walking). The rigid zones may also generally reduce the deformation of the shoe and improve the fit on the shoe.

Materials of Construction

The preferred materials of construction of the flexible parts of the shoe cover are materials such as thermoplastics and rubbers, which preferably have a low density to enable flexibility and elasticity. High elasticity materials are preferred, such as a thermoplastic elastomer (TPE), in order to substantially avoid permanent deformation of the flexible zones, which undergo amplified stress-strain. In a preferred embodiment, the thickness of the first layer is about 2 mm, but depending on the desired application and the material of construction, the thickness may be adjusted or calibrated by a person skilled in the art.

The rigid material is preferably selected from thermoplastic elastomers, thermoplastic rubbers, hardened rubbers, reinforced polymers, thermosetting plastics, and polyurethanes, or any synthetic material selected by a skilled workman. Also alternatively, the rigid zones may be non polymeric materials known in the art. For instance, when extra rigidity is desired or when material costs dictate, the rigid zones may be made of wood or metal or other reinforcement materials. Of course, in these latter cases, the method of fabricating the shoe cover may be adapted accordingly.

Preferably, the flexible zones and rigid zones are made of the same material, but of different stiffnesses.

Alternatively, the different portions of the shoe cover may be made of various materials having varying degrees of hardness, elasticity, flexibility and adherence properties. Other parts of the shoe cover may be of variable thicknesses or materials. For instance, the arch portion may be made of an extra flexible, soft material to facilitate bending of the shoe cover during the gait of a wearer. Furthermore, the top rim of the heel portion of the upper part of the shoe cover may be thicker to provide better grip and durability for fingers when installing the cover on a shoe. Also, there may be a reinforced protrusion extending longitudinally away from the heel portion of the sole, to allow a wearer to apply downward pressure thereon while the shoe in the shoe cover is upwardly removed therefrom.

Method of Fabrication

The shoe cover according to the present invention may be fabricated according to a variety of manufacturing methods, a preferred one of which is described herein.

Accordingly, the double-injection method of fabricating the shoe cover includes the steps of:
(a) injecting into a first mold a first layer having a thickness enabling flexibility and being in a form having a sole and an upper portion, the upper portion having an opening therein for inserting a shoe;
(b) sufficiently cooling the first layer;
(c) placing the first layer into a second mold; and
(d) injecting into the second mold a second layer on predetermined outer surfaces of the first layer, said predetermined surfaces comprising two bands on the ground contactable side of the sole and arranged in spaced relation to each other on opposite sides of a longitudinal axis of the sole, thereby defining an elastic band therebetween consisting essentially of the first layer and spanning longitudinally from a front end to a rear end of the sole, the second layer being of a material having a density sufficient to provide rigidity while the elastic band enables the sole to be laterally flexible.

Furthermore, after the first layer is molded, subsequent layers are formed thereon using a processing technique known in the art. In this way, different polymers may be used at different parts to bestow particular properties to the shoe cover. Alternatively, the entire shoe cover may be formed integrally within a mould, thus giving certain parts of the shoe cover a greater thickness than others. Depending on the processing technique and conditions—which may involve particular heating and cooling rates, specific polymers, moulds or extruders—certain parts of the shoe cover may be provided with different properties.

Of course, such a method may be adapted and modified by a person skilled in the art.

Other advantages of the shoe cover according to the embodiments described hereabove may be that they are low-cost, light and easily removable. They may also be simple to manufacture.

Of course, the scope of the present invention is not limited to the preferred embodiments described hereabove, but rather extends therebeyond to encompass what would be reasonably deduced by a person skilled in the art from the above description, the below claims and the appended drawings, as what was actually invented.

The invention claimed is:

1. A shoe cover comprising:
a sole made of a flexible material having;
at least two rigid bands made of rigid material, each having a first portion disposed on a ground-contacting side of the sole and arranged in spaced relation to each other on opposite sides of a longitudinal axis of the sole, thereby rigidifying the sole;
at least one elastic band made of said flexible material, spanning longitudinally between said at least two first portions from a front end to a rear end of the sole, thereby enabling the sole to be laterally flexible to adapt to a shoe over which the shoe cover fits; and
wherein at least one of the rigid bands comprises:
a second portion attached to the first portion and extending upward from the first portion along a side wall of the shoe cover, the attached first and second portions thereby producing at least one rigid L-shaped element; and
a fulcrum contacting the ground and having a fulcrum axis formed where the first and second portions are attached, the first portion being angled with respect to a horizontal plane so as to have a raised inner part raised from the ground toward a center area of the sole when no downward pressure is exerted, and enabling the second portion to rotate about the fulcrum axis and toward a side wall of the shoe inserted within the shoe cover to an inward position when a downward pressure is exerted on the raised inner part of the first portion, thereby clamping the shoe.

2. The shoe cover of claim 1, wherein the at least two first portions are arranged in parallel relation relative to each other and the longitudinal axis.

3. The shoe cover of claim 1, wherein the sole further comprises a heel section, a toe section and an arch provided therebetween, and wherein the arch is composed only of the flexible material.

4. The shoe cover of claim 3, wherein the at least two rigid bands comprise:
at least a first and a second rigid band provided respectively on an outstep side and an instep side of the toe section of the sole; and
at least a third and a fourth rigid band provided respectively on the outstep side and an instep side of the heel section of the sole.

5. The shoe cover of claim 4, wherein the heel section further comprises a rigid heel element which is provided at a heel end of the longitudinal axis of the ground-contacting side of the sole, and is in spaced relation to the third and fourth rigid bands, thereby rigidifying the heel end of the sole.

6. The shoe cover of claim 4, wherein the toe section further comprises a rigid toe element which is provided at a toe end of the longitudinal axis of the ground-contacting side of the sole, and is in spaced relation to the first and second rigid bands, thereby rigidifying the toe end of the sole.

7. The shoe cover of claim 1, wherein an angle a of the rigid L-shaped element, measured between the first and second portions is less than about 90°, the second portion thereby being inwardly biasable for clamping the shoe inserted within the shoe cover.

8. The shoe cover of claim 7, wherein the angle a of the rigid L-shaped element is between about 85° and about 45°.

9. The shoe cover of claim 1, wherein an angle β defines the angle of the first portion with respect to the horizontal plane, the angle β being between about 5° and about 30°.

10. The shoe cover of claim 1, wherein the rigid L-shaped element is provided with retention means for retaining the second portion in the inward position.

11. The shoe cover of claim 1, wherein at least two of said rigid L-shaped elements are arranged on a same side of the shoe cover and separated by an interspace made of the flexible material, the second portions of the two rigid L-shaped elements each having rigid flaps extending along the side wall of the shoe cover toward each other while remaining unconnected, the rigid flaps enabling an inward biasing of the interspace during walking, and thereby substantially reducing outward kinking of the side wall of the shoe cover.

12. The shoe cover of claim 11, wherein the at least two rigid L-shaped elements comprise four rigid L-shaped elements, two of which are arranged on an instep side of the shoe cover and two of which are arranged on an outstep side of the shoe cover, to thereby substantially reduce the outward lateral kinking of the outstep and the instep sides.

13. The shoe cover of claim 1, wherein the second portions of the at least one rigid L-shaped element comprises a first layer provided on and extending up the side wall of the shoe cover, and a second layer provided on a predetermined area of the first layer, the second layer additionally rigidifying the second portion in the predetermined area.

14. The shoe cover of claim 1, wherein at least two rigid L-shaped elements are provided on opposite sides of the shoe cover.

15. The shoe cover of claim 1, wherein the flexible material is chosen from the group comprising thermoplastics, soft rubbers and low-density flexible polymers.

16. The shoe cover of claim 1, wherein the rigid material is chosen from the group comprising thermoplastic elastomers, thermoplastic rubbers, hardened rubbers, reinforced polymers, thermosetting plastics, and high density polymers.

17. The shoe cover of claim 1, further comprising an upper portion connected to the sole to define a cavity therebetween, the upper portion being provided with an aperture to allow the shoe to be inserted therethrough and into the cavity.

18. A shoe cover comprising:
a sole and a side wall both made of flexible material;
at least one rigid L-shaped element, each comprising:
    a first portion disposed on a ground-contacting side of the sole;
    a second portion extending upward along the side wall of the shoe cover; and
    a fulcrum contacting the ground and having a fulcrum axis formed where the first and second portions are joined, the first and second portions having an angle $\alpha$ therebetween, the first portion being angled with respect to a horizontal plane so as to have a raised inner part raised from the ground toward a center area of the sole when no downward pressure is exerted, and enabling the second portion to be inwardly biasable about the fulcrum axis for clamping a shoe inserted in the shoe cover and improving an adaptive fit of the shoe cover when a downward pressure is exerted on the raised inner part of the first portion.

19. The shoe cover of claim 18, wherein the angle $\alpha$ is between about 90° and about 45°.

20. The shoe cover of claim 18, wherein an angle $\beta$ defines the angle of the first portion with respect to the horizontal plane, the angle $\beta$ being between about 0° and about 30°.

21. The shoe cover of claim 18, wherein the at least one rigid L-shaped element is at least two rigid L-shaped elements, the first portions thereof being arranged in spaced relation to each other on opposite sides of a longitudinal axis of the sole, thereby rigidifying the sole, and wherein the sole comprises at least one elastic band made of said flexible material, spanning longitudinally between said at least two first portions from a front end to a rear end of the sole, thereby enabling the sole to be laterally flexible to adapt to a shoe over which the shoe cover fits.

* * * * *